P. S. BAUER.
MACHINE FOR MAKING SURGICAL BANDAGES.
APPLICATION FILED NOV. 6, 1916.
1,238,086.
Patented Aug. 28, 1917.
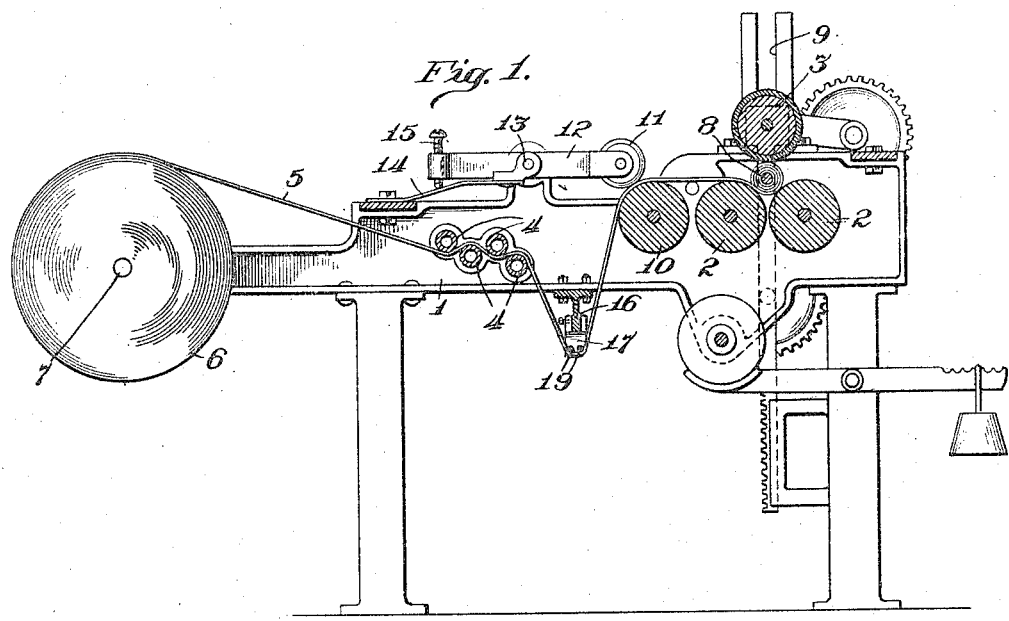
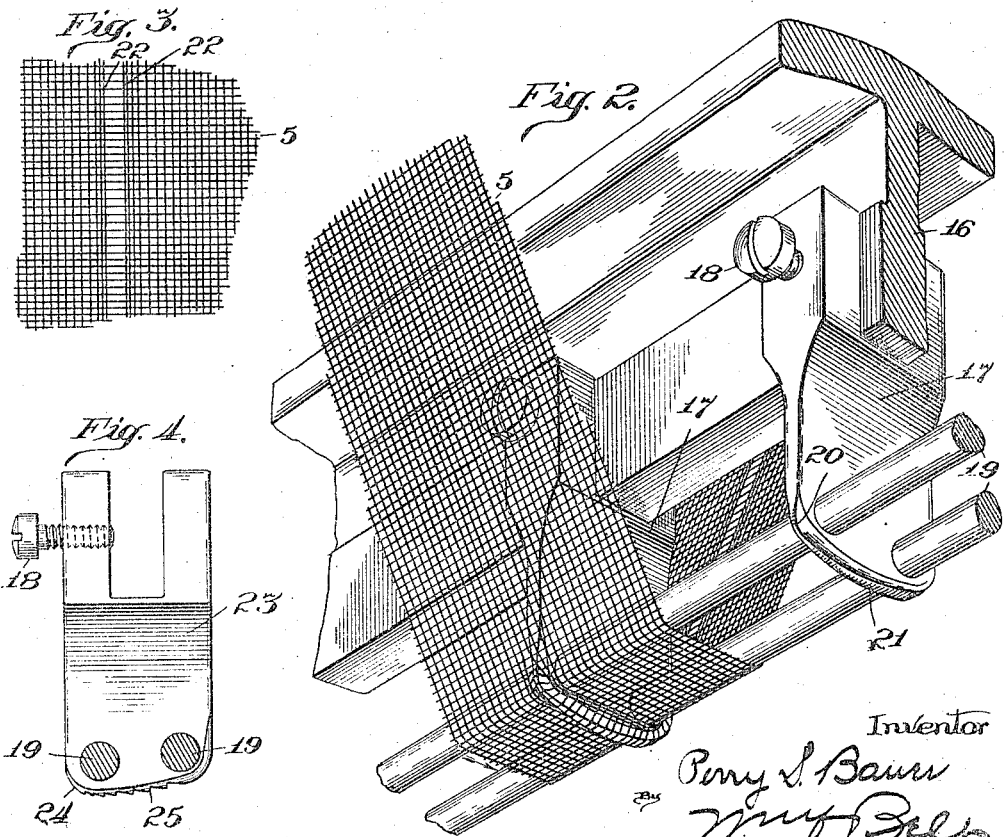
Inventor
Perry S. Bauer
By
Attorney

UNITED STATES PATENT OFFICE.

PERRY S. BAUER, OF CHICAGO, ILLINOIS, ASSIGNOR TO BAUER & BLACK, OF CHICAGO, ILLINOIS, A CORPORATION OF ILLINOIS.

MACHINE FOR MAKING SURGICAL BANDAGES.

1,238,086.

Specification of Letters Patent.

Patented Aug. 28, 1917.

Application filed November 6, 1916. Serial No. 129,702.

*To all whom it may concern:*

Be it known that I, PERRY S. BAUER, a citizen of the United States, residing at Chicago, in the county of Cook and State of Illinois, have invented certain new and useful Improvements in Machines for Making Surgical Bandages, of which the following is a specification.

This invention relates to machines for making surgical bandages and has for its primary object the provision of means for separating the warp threads of the bandage fabric at spaced intervals transversely thereof in acordance with the method disclosed in United States Letters Patent No. 1,109,185 granted to Otto C. Schulz September 1, 1914, for method of making surgical bandages.

A further object of my invention is the provision of means for supporting the spreading means whereby the latter may be readily adjusted transversely of the machine according to the desired width of the finished bandages.

Further objects and advantages of my invention will be apparent as it is better understood by reference to the following specification when read in connection with the accompanying drawing, illustrating the preferred embodiment thereof, in which—

Figure 1 is a side elevation of a machine for making bandages provided with my novel spreading means;

Fig. 2 is a detail in perspective of the spreading means and supporting means therefor;

Fig. 3 is a fragmentary plan view of the fabric after the warp threads have been separated; and Fig. 4 is a detail in elevation of a slightly different form of the spreading means.

Referring to the drawing, 1 indicates a frame of any suitable construction in which a pair of feed rollers 2, a presser roller 3 and tension rollers or bars 4 are supported. The woven bandage fabric 5 in the form of a bolt or roll 6 is supported in the frame 1 on a suitable spindle 7. The fabric 5 is fed from the roll 6 through the tension rollers or bars 4 to a spindle 8 upon which it is wound. The fabric on the spindle 8 is held in engagement with the feed rollers 2 by the presser roller 3 which is vertically adjustable in guideways 9 and is driven in any desirable manner from a suitable source of power.

A roller or platen 10 is mounted on the frame 1 adjacent the feed rollers 2 and above the platen a plurality of disks 11 are mounted to coöperate therewith, the disks being adjustably spaced to correspond to the desired width of the individual bandages to be separated from the bandage fabric. The disks 11 may be held in coöperative relation with the platen 10 by any suitable mechanism. In the drawing I have illustrated each disk 11 as supported on an arm 12 pivoted on a transverse rod 13, the rear end of each arm 12 being adapted to overlie a leaf spring 14 secured to the frame 1. Each arm 12 is provided with a screw 15 engaging the coöperating spring 14 whereby the pressure of the disks against the platen may be regulated at will.

The disks 11 may be provided with peripheral sharp cutting edges and the pressure of the disks upon the platen may be so regulated that the weft threads of the fabric are entirely severed as they pass between the disks and the platen. In this event the bandages will be separated one from the other and will be separately wound on the spindle 8. Preferably, however, the disks 11 are rather dull and the pressure is so regulated that the weft threads will be crushed and weakened by the disks so that the rolls of connected bandages on the spindle 8 may be readily separated along the weakened lines of weft threads. So much of the machine as is above described is already well-known in the art.

To provide bandages in which there are no loose warp threads to ravel or pull out from the body of the bandage at the sides thereof when the bandage is applied to a wound I devised the expedient of spreading the warp threads before the fabric passes between the disks 11 and the platen 10. To accomplish the separation according to my present invention I provide a rail 16 extending transversely of the machine and secured to the underside of the frame 1. Slidably mounted on the rail 16 are a plurality of separating elements 17 which may be adjustably secured in the desired position by screws 18. Rods 19 extend transversely of the machine and pass through suitable openings in the separating elements 17 to provide a support for the fabric 5 on either side of the separating elements. The separating elements 17 are provided with a sharpened nose 20 which is sufficiently dull to prevent cutting of the weft threads and an edge 21 of gradually increasing width forming a wedge which causes the warp threads 22 to separate as indicated in Figs. 2 and 3, the warp threads being compacted on either side of the warpless portion of the fabric. The separating elements 17 are adjusted to aline with the disks 11 to which the fabric 5 passes immediately after the separation of the warp threads and the disks 11 engage the fabric midway between the separated warp threads 22, crushing or severing the weft threads to form bandages of the desired width.

In Fig. 4 of the drawing I have illustrated a slightly different separating element 23 having a sharpened nose 24, the edge 25 being, however, serrated instead of smooth. Otherwise the separating element 23 is identical in structure with the separating element 17 previously described and may be used interchangeably therewith.

From the foregoing it will be readily understood that I have perfected a machine for making surgical bandages which is capable of producing in a simple and efficient manner bandages which are entirely free from loose warp threads. Moreover, the compacted warp threads adjacent the edges of the finished bandages increase the tensile strength of the bandages so that they are not readily torn or distorted when directly applied to wounds. My invention makes it possible to produce bandages of this character with greater speed than has heretofore been possible because of the simplicity of the mechanism for separating the warp threads.

It will be apparent that various changes may be made in the form, construction and arrangement of the parts without departing from the spirit and scope of the invention or sacrificing any of its material advantages, the forms hereinbefore described being merely preferred embodiments thereof.

I claim:

1. In a machine for making surgical bandages, the combination of mechanism for feeding a strip of fabric longitudinally through the machine, an element having stationary means for separating the longitudinal threads of the fabric as it is drawn thereover leaving the transverse threads intact and means for subsequently weakening the transverse threads.

2. In a machine for making surgical bandages, the combination of mechanism for feeding a strip of fabric longitudinally through the machine, a plurality of elements disposed at intervals transversely of the machine and having stationary means for separating the longitudinal threads of the fabric as it is drawn thereover leaving the transverse threads intact and means for subsequently weakening the transverse threads.

3. In a machine for making surgical bandages, the combination of mechanism for feeding a strip of fabric longitudinally through the machine and a plurality of elements disposed at intervals transversely of the machine and having stationary means for separating the longitudinal threads of the fabric as it is drawn thereover leaving the transverse threads intact, means for supporting said elements in relatively adjustable relation and means for subsequently weakening the transverse threads.

4. In a machine for making surgical bandages, the combination of mechanism for feeding a strip of fabric longitudinally through the machine and a plurality of stationary elements disposed at intervals transversely of the machine, each of said elements having a sharpened nose and a dull wedge-shaped edge whereby the longitudinal threads of the fabric are separated as the fabric is drawn thereover leaving the transverse threads intact.

5. In a machine for making surgical bandages, the combination of mechanism for feeding a strip of fabric longitudinally through the machine and a plurality of stationary elements disposed at intervals transversely of the machine, each of said elements having a sharpened nose and a dull wedge-shaped serrated edge whereby the longitudinal threads of the fabric are separated as the fabric is drawn thereover leaving the transverse threads intact.

6. In a machine for making surgical bandages, the combination of mechanism for feeding a strip of fabric longitudinally through the machine and a plurality of stationary elements disposed at intervals transversely of the machine, each of said elements having a sharpened nose and a dull wedge-shaped serrated edge whereby the longitudinal threads of the fabric are separated as the fabric is drawn thereover leaving the transverse threads intact, and means for supporting said elements in relatively adjustable relation.

7. In a machine for making surgical bandages, the combination of mechanism for feeding a strip of fabric longitudinally through the machine, a plurality of stationary elements disposed at intervals transversely of the machine and having a dull wedge-shaped edge, for separating the longitudinal threads of the fabric as it is drawn thereover leaving the transverse threads intact, means for supporting the fabric between said elements and means for subsequently weakening the transverse threads.

8. In a machine for making surgical bandages, the combination of mechanism for feeding a strip of fabric longitudinally through the machine, a stationary element having a dull wedge-shaped edge for separating the longitudinal threads of the fabric leaving the transverse threads intact, means on either side of said element for supporting the fabric and means for subsequently weakening the transverse threads.

9. In a machine for making surgical bandages, the combination of mechanism for feeding a strip of fabric longitudinally through the machine, a plurality of stationary elements disposed at intervals transversely of the machine and having a dull wedge-shaped edge for separating the longitudinal threads of the fabric as it is drawn thereover leaving the transverse threads intact, means for supporting the fabric between said elements, means for supporting said elements in relatively adjustable relation and means for subsequently weakening the transverse threads.

10. In a machine for making surgical bandages, the combination of mechanism for feeding a strip of fabric longitudinally through the machine, a plurality of elements disposed at intervals transversely of the machine and having stationary means for separating the longitudinal threads of the fabric as it is drawn thereover leaving the transverse threads intact, means for supporting the fabric between said elements, and means for subsequently weakening the transverse threads of the fabric between the separated longitudinal threads.

11. In a machine for making surgical bandages, the combination of mechanism to feed the fabric longitudinally through the machine, a guide to support the fabric transversely thereof, a rigid immovable obstruction projecting above said guide and adapted to separate the longitudinal threads at a line intermediate the width of the fabric as it passes thereover leaving the transverse threads intact and means for subsequently weakening the transverse threads.

12. In a machine for making surgical bandages, the combination of mechanism to feed the fabric longitudinally through the machine, a guide to support the fabric transversely thereof, and a dull wedge-shaped obstruction rigidly supported to continually project above said guide and adapted to separate the longitudinal threads at a line intermediate the width of the fabric as it passes thereover leaving the transverse threads intact.

13. In a machine for making surgical bandages, the combination of mechanism to feed the fabric longitudinally through the machine, a guide to support the fabric transversely thereof, an obstruction arranged in the path of travel of the fabric and projecting above said guide, said obstruction being sharpened at its forward end and gradually increasing in width toward its rear end and adapted to separate the longitudinal threads at a line intermediate the width of the fabric as it passes thereover leaving the transverse threads intact and means for subsequently weakening the transverse threads.

14. In a machine for making surgical bandages, the combination of mechanism to feed the fabric longitudinally through the machine, a rigid immovable obstruction having its longitudinal axis in the direction of movement of the fabric, said obstruction being sharpened at its forward end to separate the longitudinal threads of the fabric leaving the transverse threads intact, and means to support the fabric on either side of said obstruction, and means for subsequently weakening the transverse threads.

PERRY S. BAUER.

Witnesses:
THOMAS P. HAMILTON,
OTTO J. HAFFNER.

Copies of this patent may be obtained for five cents each, by addressing the "Commissioner of Patents, Washington, D. C."